Figure 1:
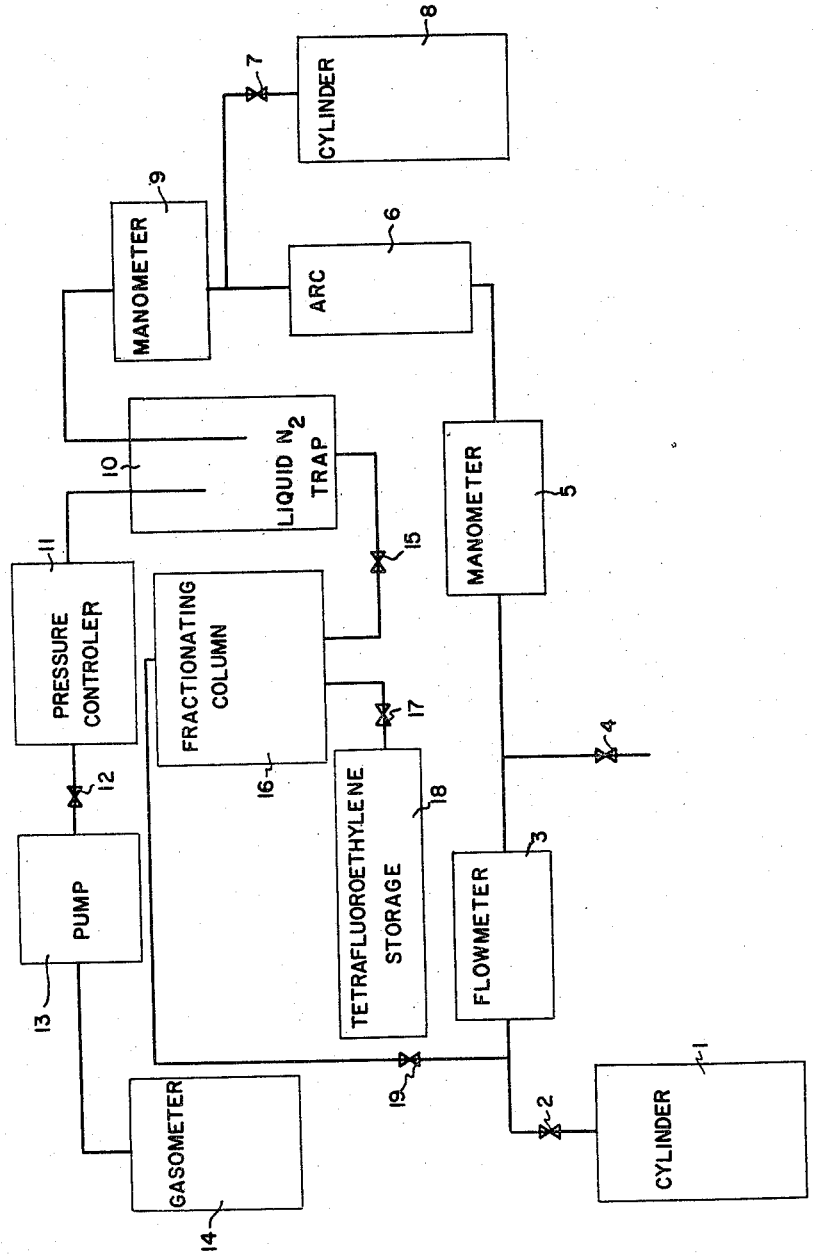

May 24, 1955    M. W. FARLOW    2,709,182
PROCESS FOR PRODUCING TETRAFLUOROETHYLENE
FROM PERFLUOROCARBON HAVING AT
LEAST THREE CARBON ATOMS
Filed Nov. 6, 1953    3 Sheets-Sheet 3

INVENTOR
MARK W. FARLOW
BY
ATTORNEY

United States Patent Office 2,709,182
Patented May 24, 1955

2,709,182

PROCESS FOR PRODUCING TETRAFLUORO-ETHYLENE FROM PERFLUOROCARBON HAVING AT LEAST THREE CARBON ATOMS

Mark W. Farlow, Holly Oak, Del., assignor to E. I. du Pont de Nemours and Company, Wilmington, Del., a corporation of Delaware Application November 6, 1953, Serial No. 390,461

13 Claims. (Cl. 260—653)

This invention relates to a new process for the preparation of tetrafluoroethylene.

Tetrafluoroethylene is an unsaturated fluorocarbon of considerable utility in various applications. In particular, it is very useful in the form of its polymers where it has achieved commercial success. Even wider use for this fluorocarbon could be attained if more economical methods for its preparation could be devised, since even in the best of the heretofore known methods for its preparation, it is not possible to obtain high yields of the desired tetrafluoroethylene.

This invention has as an object a more economical process for the preparation of tetrafluoroethylene. Other objects will appear hereinafter.

These objects are accomplished by the present invention wherein a fluorocarbon, i. e., a perfluorohydrocarbon, of the formula $C_xF_y$ which is liquid at room temperature or lower, and in which $x$ and $y$ are positive whole numbers, with $x$ being at least 3, and in which the ratio of $y$ to $x$ is less than 2.7:1 is pyrolyzed by heating at a temperature of at least 1500° C. In a preferred modification of the invention substantially complete conversion of the starting fluorocarbon to tetrafluoroethylene is accomplished by separating out the tetrafluoroethylene and recycling the remainder of the fluorocarbon reaction mixture.

The pyrolysis of the fluorocarbons of the above formula can be accomplished by passing the fluorocarbon through a reaction zone heated to a temperature of at least 1500° C. and preferably at 2000–4000° C. The reaction zone can be a hollow tube of refractory material heated externally to the desired temperature by conventional means, or the liquid or gaseous perfluorocarbon reactant can be exposed to an electric arc. Especially good results are obtained by passing the fluorocarbon through an arc produced between carbon electrodes, in which case the temperature is estimated to be between 2500 and 4000° C. The carbon arc is especially suitable for pyrolyzing fluorocarbons having a ratio of fluorine to carbon of more than 2 to 1, since with such fluorocarbons it is beneficial to have carbon present in the reaction zone to react with the excess of fluorine. On the other hand, particularly when the ratio of fluorine to carbon in the fluorocarbon reactant is two or less, electrodes of other materials of construction can be used to produce the electric arc. For example, electrodes of tungsten or of zirconia can be used.

Practical conversions to tetrafluoroethylene can be obtained only if the product from the hot reaction zone is cooled rapidly to a temperature of 400° C. or below, i. e., quenched. While the chemical processes that occur during quenching are not well understood, it has been demonstrated that quenching of the product from the reaction temperature to a temperature no higher than 400° C. is essential to the success of the process. The time during which the reaction mixture is cooled to below the decomposition temperature of tetrafluoroethylene, i. e., the time from pyrolysis temperature to below 400° C., should not exceed one second and preferably is in the range from about 0.001 second to 0.1 second. The rapid quenching of the reaction mixture is essential to practical operation in the process of this invention.

The absolute pressure in the reaction zone is not critical. Satisfactory results can be obtained at pressures as low as 1 mm. of mercury as well as at atmospheric pressure and even under superatmospheric pressure. In general, low pressures are preferred when passing vapors of a fluorocarbon through a carbon arc, since the operation of the arc becomes more difficult with higher pressures. Superatmospheric pressures are useful when it is desired to pyrolyze low boiling fluorocarbons in an arc in which the electrodes are submerged in the liquid fluorocarbon. The rate of passage of the fluorocarbon reactant through the reaction zone can vary widely in the process of this invention since the rate of flow is not critical. The optimum rate or flow depends on the throughput of electric power in the arc, or on the capacity of the external heating means being used. In general, the greater the amount of electric current provided to the arc or the greater the amount of external heat supplied the greater is the rate at which the fluorocarbon reactant can be pyrolyzed.

When an electric arc is used as a source of heat, the arc can be operated at low or high voltage and with either direct or alternating current. Good results in the process of this invention are obtained when the pyrolysis is carried out in electric arcs produced between carbon electrodes with electric current of 10 to 50 volts and of 10 to 30 amperes. However, the process is not limited to the use of this narrow range of voltage and amperage.

The product of the pyrolysis of the fluorocarbons of the above defined composition is normally a mixture of fluorocarbons containing a high amount of the desired tetrafluoroethylene. This compound is produced by a process which involves, among other things, the breaking of carbon-carbon bonds. In addition to the tetrafluoroethylene, there are also formed appreciable quantities of carbon tetrafluoride, hexafluoropropene, octafluoropropane and hexafluoroethane and minor amounts of other perfluorocarbons, depending on the particular reaction conditions employed. The carbon tetrafluoride and hexafluoroethane formed as by-products have les than three carbon atoms. These fluorocarbons are in turn converted to tetrafluoroethylene during the recycling step by a process described in my concurrently filed, copending U. S. application Ser. No. 390,441, now abandoned and replaced by Serial No. 477,678, filed December 27, 1954.

The separation of the tetrafluoroethylene from the reaction mixture can be accomplished by conventional methods, for example, by careful fractional distillation. The boiling points of hexafluoroethane and tetrafluoroethylene are quite close together, and, when appreciable quantities of hexafluoroethane are produced, it is necessary to use very efficient fractionating columns to separate such mixtures. These can also be separated by selective solvent extraction or by selective adsorption on solids. However, because of its inertness, the presence of small amounts of hexafluoroethane does not interfere with the use of tetrafluoroethylene for most purposes, including polymerization.

The process of this invention is further illustrated by the following examples. In Examples I to III, the pyrolysis is carried out by passing the fluorocarbon vapor through a carbon arc. A flow sheet of a preferred type of equipment for pyrolysis of perfluoro compounds in a carbon arc is shown in Figure 1. The gas lines are of copper tubing. In a typical operation, the perfluorocarbon reactant is contained in cylinder or tank 1. Valves 2, 4, 15 and 19 are closed, and valves 7 and 12 are opened. The apparatus is evacuated by means of pump 13 to remove the air, trap 10 is cooled with liquid nitrogen, valve 7 is closed, argon (or other inert gas) is admitted through valve 4 to the desired operating pressure, and pressure controller 11 is set to maintain that desired pressure. The arc 6, is struck, the reactant gas is passed through the arc at the desired rate (flowmeter 3) and the product is condensed in trap 10. During operation the arc inlet pressure (manometer 5) will be appreciably higher than the exit pressure (manometer 9) because of the constriction involved in the arc passages. When it is desired to stop the reaction, the arc current is cut off, valves 2 and 12 are closed, valve 7 is opened, cylinder 8 is cooled with liquid nitrogen, trap 10 is allowed to warm to room temperature, and the volatile product is distilled into cylinder 8. Finally, if desired, cylinder 8 can be pumped to remove traces of argon or other noncondensables, after which the cylinder valve is closed and the product is allowed to warm to room temperature.

In a continuous operation the trap 10 is connected through valve 15 to fractionating column 16 which separates, so far as possible, the tetrafluoroethylene from the efflux from the arc, sends the tetrafluoroethylene of greater or less purity, depending on the grade desired, to tetrafluoroethylene storage 18 and returns the remaining fluorocarbon products through valve 19 and flowmeter 3 to the arc 6. The separation of tetrafluoroethylene from other fluorocarbons, even hexafluoroethane, is readily effected in a highly efficient fractionating column.

Figure 2:
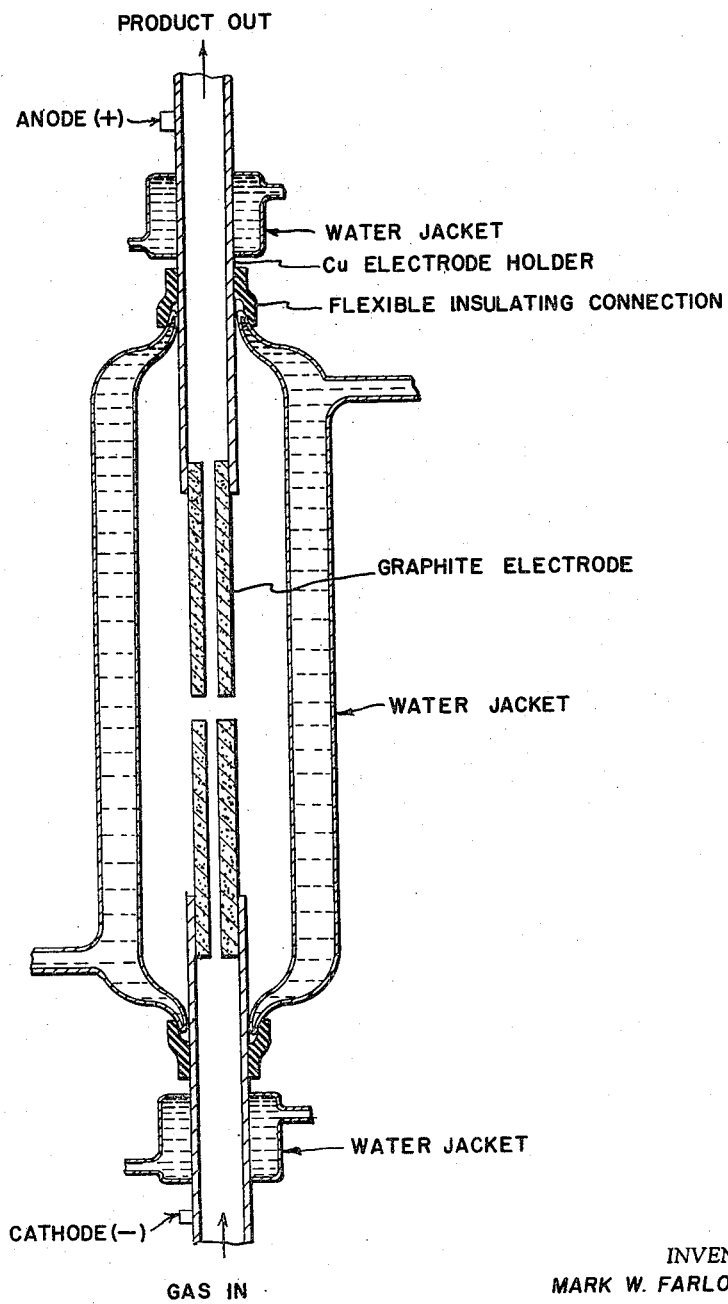

A detail of the arc 6 used with gaseous reactants is shown in Figure 2. The electrodes consist of graphite cylinders. The water jackets are made of electrically non-conductive material. The arc is struck by contacting the two electrodes. Thereafter, the electrode gap is controlled to effect the requisite current. A direct current voltage is applied across the electrode in a conventional manner.

Figure 3:
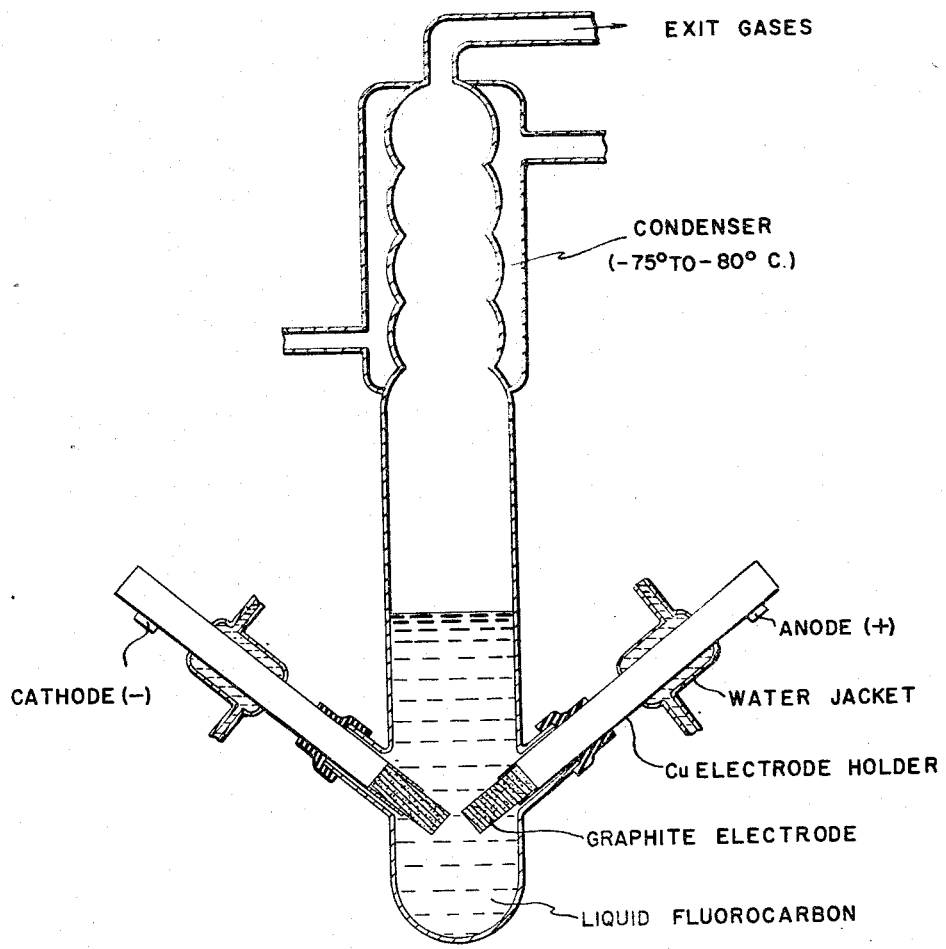

A detail of apparatus having a carbon arc submerged in liquid fluorocarbon reactant is shown in Figure 3. In this apparatus the arc is operated as described in the preceding paragraph.

*Example I*

Octafluoropropane is passed through a carbon tube arc of 0.1 inch internal diameter (Figures 1 and 2) at a rate of 67 g. per hour, at an arc inlet pressure of 32 mm. of mercury, absolute, and at an exit pressure of 7 mm. of mercury (absolute). The arc is operated at 20–25 volts and 20 amperes. The products are cooled from arc temperature to below 400° C. in less than about 0.1 second. The ratio, by volume, of fluorocarbons in exit gas is as follows: tetrafluoroethylene, 50; carbon tetrafluoride, 20; octafluoropropane, 20; hexafluoroethane, 5; and hexafluoropropene, 5.

*Example II*

Hexafluoropropene is passed through a carbon arc (Figures 1 and 2) at a rate of 75 g. per hour, at an arc inlet pressure of 38–42 mm. of mercury, absolute, and at an exit pressure of 7 mm. of mercury (absolute). The arc is operated at 20–25 volts and 20 amperes direct current. The quenching is rapid, the time from reaction temperature to below 400° C. being less than 0.1 second. The ratio, by volume, of the products in the exit gas is: tetrafluoroethylene, 50; hexafluoropropene, 40; carbon tetrafluoride, 10; hexafluoroethane, 2; and octafluoropropane, 1.

*Example III*

A mixture of perfluorodimethylcyclohexane isomers, $C_8F_{16}$, prepared by exhaustive fluorination of mixed xylenes, is passed through a carbon arc similar to that shown in Figure 2, at a pressure of about 10 mm. of mercury, absolute, at a rate of 20 g. per hour. The arc is operated with direct current of 20–30 volts and 12–21 amperes. The time from reaction temperature to below 400° C. is less than 0.5 second. After three recyclings with intermediate rapid quenching and isolation of tetrafluoroethylene, the final products are 50 volumes tetrafluoroethylene, 30 volumes carbon tetrafluoride, and 20 volumes higher fluorocarbons.

The following example illustrates the pyrolysis of a liquid perfluorocarbon by means of a submerged carbon arc at atmospheric pressure.

*Example IV*

A carbon arc is operated under the surface of liquid perfluorodimethylcyclohexane (the mixture of isomers described in Example III) at atmospheric pressure, in a vessel fitted with a reflux condenser cooled by a liquid maintained at $-75°$ to $-80°$ C. and a take-off at the top of the condenser for the recovery of uncondensed gaseous products (Figure 3). With the arc produced by a direct current of 18 volts and 12–13 amperes, the liquid perfluorocarbon refluxes vigorously thus giving very rapid quenching of the reaction products and the gas evolution is 4.6 liters per hour, measured at room temperature and atmospheric pressure. The gas contains, in addition to a trace of the starting material, 25 molar per cent of tetrafluoroethylene, the remainder being a mixture consisting mainly of carbon tetrafluoride, hexafluoroethane, hexafluoropropene and octafluoropropane.

The examples have illustrated the process of this invention with specific reference to certain fluorocarbons. However, the invention is generically applicable to fluorocarbons, i. e., perfluorohydrocarbons, having the formula $C_xF_y$, wherein $x$ and $y$ are positive whole numbers, $x$ is at least 3 and the ratio of $y$ to $x$ is less than 2.7:1. Specific examples of other perfluorocarbons of this type which are operable include perfluoro-1,3-butadiene, octafluorocyclobutane, $C_4F_8$; decafluorobutane, $C_4F_{10}$; and the perfluorocarbons obtained by exhaustive fluorination of petroleum fractions, e. g., perfluorinated lubricating oil, $C_{21}F_{44}$, and perfluorinated kerosene having from 10 to 14 carbon atoms.

The fluorocarbon being pyrolyzed, and any carbon used in the process, are preferably substantially anhydrous. In particular, care should be taken to dehydrate the carbon prior to reaction, since carbon, especially of the active or absorbent variety, can contain significant amounts of water even at high temperature.

The examples have illustrated the process of this invention by pyrolysis of the fluorocarbons in electric arcs. The use of arcs, particularly between carbon electrodes, is a preferred way of carrying out this process. However, the pyrolysis can be carried out in other types of electrodes, for example, tungsten and zirconia electrodes; and in reaction vessels made of carbon or other forms of refractory materials. When carbon reactors or reactors packed with carbon are used, any form of carbon, either amorphous or crystalline, is suitable. Thus, there can be used coal, graphite, diamond, charcoal and the various forms of carbon black, such as lamp black, acetylene black, bone black, etc. The powdered forms of carbon are, of course, used as packing in the form of pellets or supported on supports such as coke. In general, best results are obtained with active carbon, of which many well-known varieties are available commercially. In general, active carbon is very finely divided porous carbon having a total surface area of at least 20 square meters per gram (Hassler, "Active Carbon," Chemical Publishing Company, 1951, page 127).

Important advantages of the process of this invention over the hitherto known methods of preparing tetrafluoroethylene reside in the fact that any of the wide variety of perfluorocarbons having the formula described previously can be pyrolyzed to high yields of tetrafluoroethylene. Especially high yields of this desired material are attained by separating the tetrafluoroethylene from the reaction mixture obtained by one pass of the perfluoro carbon through the pyrolysis zone and then recycling the by-products. In this way, substantially complete conversion of the starting material to the desired tetrafluoroethylene is attained.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of tetrafluoroethylene wherein a fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products.

2. A process for the preparation of tetrafluoroethylene wherein a fluorocarbon of at least three carbons and of melting point no higher than 25° C. is pyrolyzed by heating the same in a carbon arc, the pyrolysis mixture is rapidly cooled below 400° C., and the tetrafluoroethylene is removed from the pyrolysis products.

3. A process for the preparation of tetrafluoroethylene wherein an open chain fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products.

4. A process for the preparation of tetrafluoroethylene wherein a ring fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products.

5. A process for the preparation of tetrafluoroethylene wherein octafluoropropane is pyrolyzed by heating the same to a temperature of at least 1500° C., the pyrolysis mixture is rapidly cooled below 400° C., and the tetrafluoroethylene is removed from the pyrolysis products.

6. A process for the preparation of tetrafluoroethylene wherein hexafluoropropene is pyrolyzed by heating the same to a temperature of at least 1500° C., the pyrolysis mixture is rapidly cooled below 400° C., and the tetrafluoroethylene is removed from the pyrolysis products.

7. A process for the preparation of tetrafluoroethylene wherein a mixture of perfluorodimethylcyclohexanes is pyrolyzed by heating the same to a temperature of at least 1500° C., the pyrolysis mixture is rapidly cooled below 400° C., and the tetrafluoroethylene is removed from the pyrolysis products.

8. A process for the preparation of tetrafluoroethylene wherein a fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

9. A process for the preparation of tetrafluoroethylene wherein an open chain fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

10. A process for the preparation of tetrafluoroethylene wherein a ring fluorocarbon of at least three carbons and of melting point no higher than 25° C. is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

11. A process for the preparation of tetrafluoroethylene wherein octafluoropropane is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

12. A process for the preparation of tetrafluoroethylene wherein hexafluoropropene is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

13. A process for the preparation of tetrafluoroethylene wherein a mixture of perfluorodimethylcyclohexane is pyrolyzed by heating the same to a temperature of at least 1500° C., the pyrolysis mixture is rapidly cooled below 400° C., and the tetrafluoroethylene is removed from the pyrolysis products, the remainder of which is again exposed to pyrolysis.

References Cited in the file of this patent

UNITED STATES PATENTS

| | | |
|---|---|---|
| 1,023,783 | Knapp | Apr. 16, 1912 |
| 1,056,045 | Muray | Mar. 18, 1913 |
| 2,480,560 | Downing et al. | Aug. 30, 1949 |
| 2,551,573 | Downing et al. | May 8, 1951 |
| 2,664,449 | Miller | Dec. 29, 1953 |
| 2,674,631 | Miller et al. | Apr. 6, 1954 |
| 2,676,145 | Weisz et al. | Apr. 20, 1954 |